US012649410B2

(12) United States Patent
Hong

(10) Patent No.: US 12,649,410 B2
(45) Date of Patent: Jun. 9, 2026

(54) ELECTRONIC LAMP AIMING SYSTEM AND METHOD FOR A VEHICLE

(71) Applicants:HYUNDAI MOTOR COMPANY, Seoul (KR); KIA CORPORATION, Seoul (KR)

(72) Inventor: Seung-Pyo Hong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/956,409

(22) Filed: Nov. 22, 2024

(65) Prior Publication Data

US 2026/0001476 A1     Jan. 1, 2026

(30) Foreign Application Priority Data

Jun. 26, 2024     (KR) ........................ 10-2024-0083600

(51) Int. Cl.
B60Q 1/00 (2006.01)
B60Q 1/115 (2006.01)
(52) U.S. Cl.
CPC ........... B60Q 1/115 (2013.01); B60Q 1/0023 (2013.01); B60Q 2200/30 (2013.01); B60Q 2300/13 (2013.01)
(58) Field of Classification Search
CPC ................................ B60Q 1/08; B60Q 1/0023
See application file for complete search history.

(56) References Cited

U.S. PATENT DOCUMENTS

| | | | |
|---|---|---|---|
| 2023/0001847 A1* | 1/2023 | Child ........................ | B60Q 1/11 |
| 2023/0382289 A1* | 11/2023 | Watano .................. | H04N 23/74 |
| 2024/0071032 A1* | 2/2024 | Hong ...................... | G06V 20/56 |

FOREIGN PATENT DOCUMENTS

| | | | | | |
|---|---|---|---|---|---|
| KR | 20220159760 A | * | 12/2022 | ............ | G01M 11/06 |
| KR | 102812374 B1 | * | 5/2025 | ............ | B60W 40/02 |

* cited by examiner

*Primary Examiner* — Gerald J Sufleta, II
(74) *Attorney, Agent, or Firm* — Lempia Summerfield Katz LLC

(57) ABSTRACT

A lamp aiming method is implemented in an electronic lamp aiming system for a vehicle. In the system and method, a controller recognizes a light distribution area using information of a target in top/bottom/left/right angles in a front image of an image receiver for the target, which is light-distributed to a light source of a head lamp. Another controller adjusts a pixel area of the light source based on the light distribution area to perform aiming correction and to apply the adjusted pixel area to the light distribution of the lamp. Through an electronic aiming structure not using head lamp aiming instruments, direct matching is achieved between the head lamp and a camera, which is required for high-precision aiming. A vehicle attitude can also be determined without sensors by using the secured matching.

10 Claims, 7 Drawing Sheets

<CAMERA UNMATCHING>
①

<CAMERA & HEAD LAMP MATCHING>
②

<CAMERA & VANISHING POINT
MATCHING ON BASIS OF
DRIVING INFORMATION>
③

<CAMERA & HEAD LAMP MATCHING>
④

FIG. 4

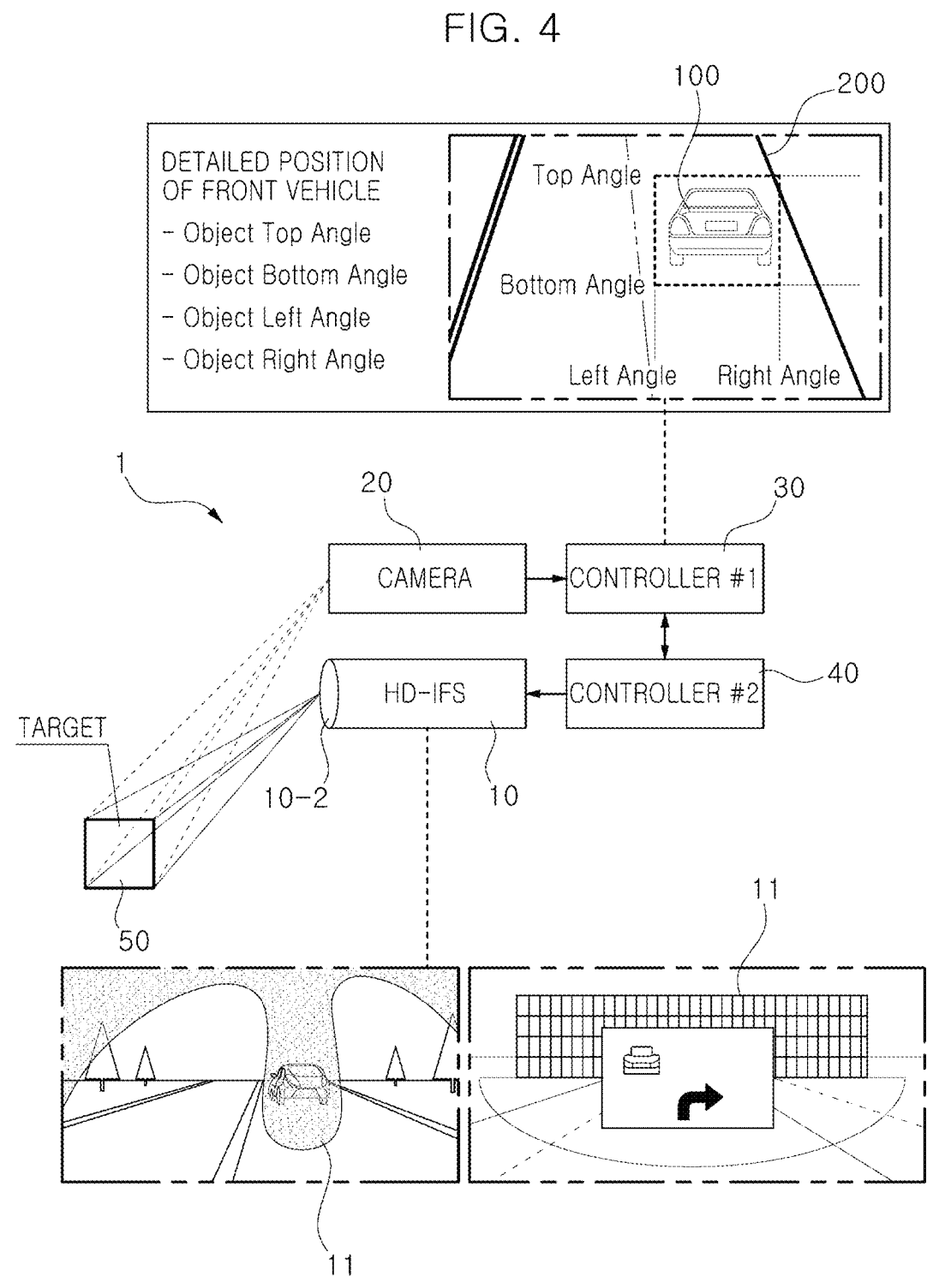

DETAILED POSITION
OF FRONT VEHICLE

- Object Top Angle
- Object Bottom Angle
- Object Left Angle
- Object Right Angle Top Angle Bottom Angle Left Angle     Right Angle

CAMERA

CONTROLLER #1

HD-IFS

CONTROLLER #2

TARGET

FIG. 6

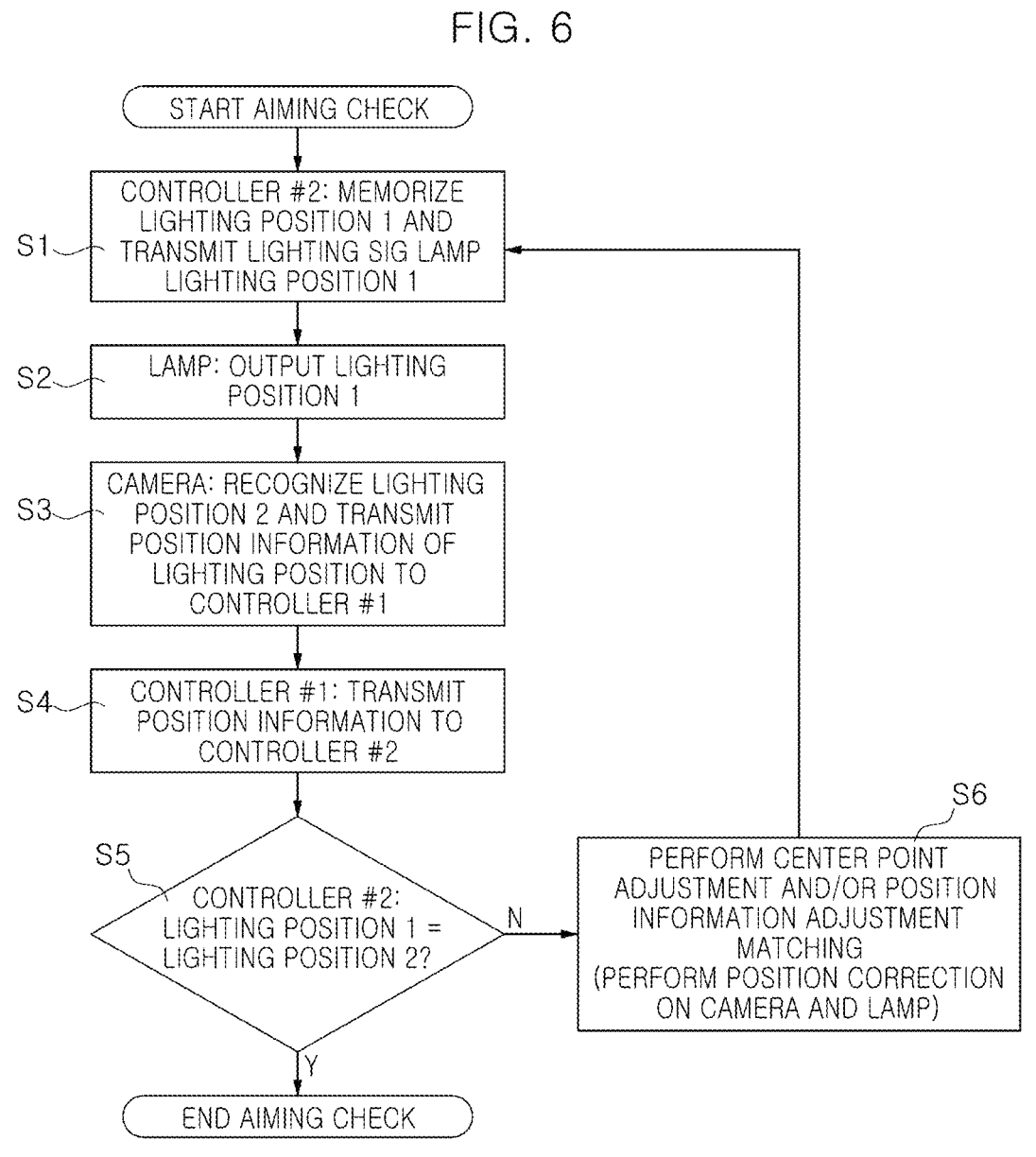

START AIMING CHECK

S1 — CONTROLLER #2: MEMORIZE LIGHTING POSITION 1 AND TRANSMIT LIGHTING SIG LAMP LIGHTING POSITION 1

S2 — LAMP: OUTPUT LIGHTING POSITION 1

S3 — CAMERA: RECOGNIZE LIGHTING POSITION 2 AND TRANSMIT POSITION INFORMATION OF LIGHTING POSITION TO CONTROLLER #1

S4 — CONTROLLER #1: TRANSMIT POSITION INFORMATION TO CONTROLLER #2

S5 — CONTROLLER #2: LIGHTING POSITION 1 = LIGHTING POSITION 2?

N

S6 — PERFORM CENTER POINT ADJUSTMENT AND/OR POSITION INFORMATION ADJUSTMENT MATCHING (PERFORM POSITION CORRECTION ON CAMERA AND LAMP)

Y

END AIMING CHECK

ELECTRONIC LAMP AIMING SYSTEM AND METHOD FOR A VEHICLE

CROSS-REFERENCE(S) TO RELATED APPLICATIONS

This application claims priority to Korean Patent Application No. 10-2024-0083600, filed on Jun. 26, 2024, which is incorporated herein by reference in its entirety.

BACKGROUND OF PRESENT DISCLOSURE

Technical Field

Embodiments of the present disclosure relate to an electronic lamp aiming system and method for a vehicle, and more particularly, to an electronic aiming system and method that can perform aiming adjustment with high precision by securing direct matching between a camera and a head lamp.

Description of Related Art

Generally, a head lamp of a vehicle should meet regulations on lamp aiming to secure a forward vision of a driver while driving at night and to prevent a driver of an oncoming vehicle on an opposing lane from being dazzled. This requires setting and measuring a vehicle alignment and a head lamp light projection reference point and a height of the head lamp projected onto a screen.

For the aiming adjustment of a head lamp, a cross-hair laser leveler, a screen, and a camera are required.

However, a head lamp using micro lens array (MLA) lenses applied to an electric vehicle has recently been experiencing a color bleeding problem. The problem results from glue applied to bond the lenses and holders after correcting their positions through a complicated active align process, which causes difficulty in the aiming adjustment for a single-product head lamp.

In addition, the head lamp should be maintained in an accurate aiming state even when mounted on the vehicle. To this end, head lamp aiming adjustment instruments mounted on the vehicle are required.

Referring to FIG. 1, it can be seen that a leveling actuator, front/rear sensors, an electric control unit (ECU), and communication wires are installed in the vehicle as the head lamp aiming adjustment instruments.

FIG. 2 shows an aiming correction of the head lamp through the head lamp aiming adjustment instruments. The aiming correction is performed through a procedure of "① camera unmatching→② camera and head lamp matching→③ camera and vanishing point matching on the basis of driving information→④ camera and head lamp matching."

However, the procedure of "① through ④" secures the matching between a vehicle attitude and the head lamp, and then secures the matching between the camera and the head lamp. However, this procedure does not directly secure the matching between the head lamp and the camera. Thus, there is a problem in that it is difficult to implement high aiming.

SUMMARY OF PRESENT DISCLOSURE

Embodiments of the present disclosure are directed to providing an electronic lamp aiming system for a vehicle. The system can perform high-precision aiming by securing direct matching between a head lamp and a camera. The system can also replace head lamp aiming adjustment instruments used to determine matching of a head lamp and a vehicle attitude. The system can also achieve matching of the head lamp and the camera through an unused light emit surface (LES) area of a light source. Thus, even when manufacturing a single product of a micro lens array (MLA) head lamp, a complicated active align process and a glue application process causing color bleeding are eliminated. Embodiments of the present disclosure are also directed to providing an aiming method thereof.

Other objects and advantages of the present disclosure can be understood by the following description and can become apparent with reference to the embodiments of the present disclosure. Also, it should be apparent to those having ordinary skill in the art to which the present disclosure pertains that the objects and advantages of the present disclosure can be realized by the systems and methods as claimed and by combinations thereof.

In accordance with an embodiment of the present disclosure, an electronic lamp aiming system for a vehicle is provided. The system includes a lamp, which has a light source and outputs a first lighting position (lighting position 1 below and in the drawings). The system also includes a first controller (controller #2 below and in the drawings) configured to memorize the first lighting position and transmit a lighting signal of the first lighting position to the lamp. The system also includes an image receiver, which receives image information from a target that is light-distributed by the lamp. The system also includes a second controller (controller #1 below and in the drawings) configured to recognize a second lighting position (lighting position 2 below and in the drawings) from the image information and to transmit position information of the second lighting position to the first controller. The first controller checks whether the first and second lighting positions match. When a lighting position of the lamp and an actual camera recognition position do not match, the first controller adjusts a lamp center point to a camera center point to match the lamp center point and the camera center point, thereby performing position correction.

In addition, in accordance with another embodiment of the present disclosure, an electronic lamp aiming system for a vehicle is provided. The system includes a lamp, which has a light source and outputs a first lighting position. The system also includes a first a controller configured to memorize the first lighting position and to transmit a lighting signal of the first lighting position to the lamp. The system also includes an image receiver, which receives image information from a target that is light-distributed by the lamp. The system also includes a second controller configured to recognize a second lighting position from the image information and to transmit position information of the second lighting position to the first controller. The first controller checks whether the first and second lighting positions match. When a lighting position of the lamp and an actual camera recognition position do not match, the first controller adjusts a camera center point to a lamp center point to match the camera center point to the lamp center point, thereby performing position correction.

In one example, the lamp may be an intelligent front lighting system (HD-IFS) and the light source may be a multi-element light-emitting diode (LED). When the above first and second lighting positions do not match, the lighting position may be moved by changing the lighting LED element. Also, the lighting LED element may be included in an unused light emit surface (LES) area of the light source.

In addition, in accordance with still another embodiment of the present disclosure, an electronic lamp aiming method using an electronic aiming system is provided In the system, a lamp center point is matched to a camera center point through center point adjustment matching. The electronic aiming method includes transmitting, by a first controller, a memorized first lighting position as a lighting signal of a lamp. The method also includes outputting the first lighting position from the lamp. The method also includes recognizing, by an image receiver, a second lighting position of the lamp and transmitting position information of the second lighting position to a second controller. The method also includes transmitting, by the second controller, the position information of the second lighting position to the first controller and confirming, by the first controller, whether the first lighting position and the second lighting position match. When the first lighting position and the second lighting position do not match, a lamp center point of the lamp is adjusted, and the procedure is repeated.

In addition, in accordance with yet another embodiment of the present disclosure, an electronic lamp aiming method using an electronic aiming system is provided. In the system, a camera center point is matched to a lamp center point through position information adjustment matching. The electronic aiming method includes transmitting, by a first controller, a memorized first lighting position as a lighting signal of a lamp. The method also includes outputting an actual lighting position generated from the lamp different from the first lighting position. The method also includes recognizing, by an image receiver, the actual lighting position as a second lighting position of the lamp and transmitting position information of the second lighting position to a second controller. The method also includes transmitting, by the second controller, the position information of the second lighting position 2 to the first controller and confirming, by the first controller, whether the first lighting position and the second lighting position match. When the first lighting position and the second lighting position do not match, the camera center point of the image receiver and the lamp center point of the lamp are adjusted.

In one example, the adjustment of the camera center point and the lamp center point may be performed by matching the camera center point to the lamp center point, and the first and second lighting positions may be recognized by a multielement LED included in an unused LES area of a light source.

In one example, the second controller may confirm the first lighting position or the second lighting position by one of an upper angle, a lower angle, a left angle, or a right angle given to a target, which is a front vehicle or a recognizable symbol that is light-distributed by the lamp.

BRIEF DESCRIPTION OF THE DRAWINGS

FIG. 4 is a diagram illustrating an operating state in which the electronic aiming system according to the present disclosure secures matching between a camera and a lamp using a target.

FIG. 6 is a flowchart illustrating an electronic lamp aiming method for a vehicle according to the present disclosure.

DESCRIPTION OF SPECIFIC EMBODIMENTS

Embodiments of the present disclosure are described below in more detail with reference to the accompanying drawings. These embodiments are examples of the present disclosure and may be embodied in various other different forms by those of ordinary skill in the art to which the present disclosure pertains. Thus, the present disclosure is not limited to these embodiments.

When a component, device, element, controller, module, or the like of the present disclosure is described as having a purpose or performing an operation, function, or the like, the component, device, element, controller, module, or the like should be considered herein as being "configured to" meet that purpose or to perform that operation or function. Each component, device, element, controller, module, or the like, may separately embody or be included with a processor and a memory, such as a non-transitory computer readable media, as part of such an apparatus.

Figure 1:
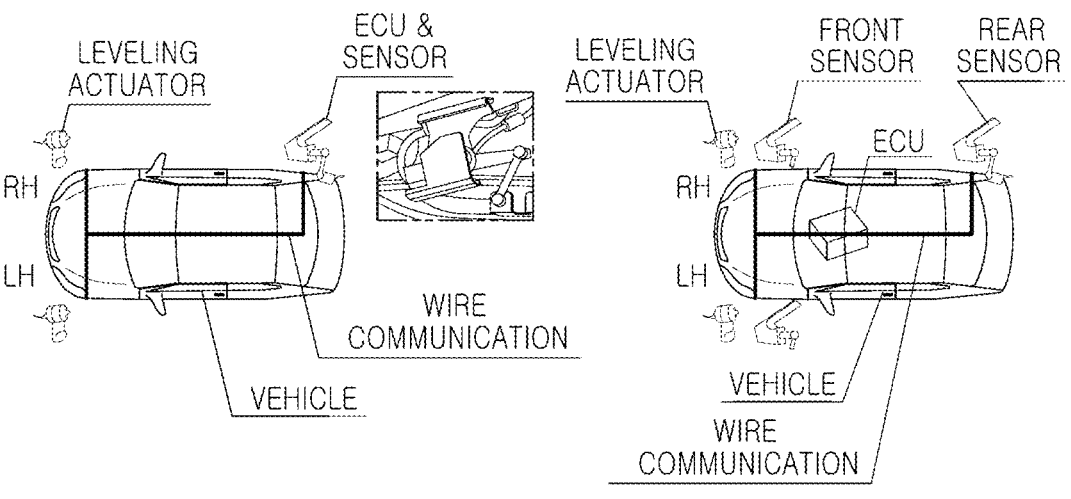
FIG. 1 is a diagram illustrating an example of lamp aiming adjustment instruments mounted on a vehicle according to the related art.
Figure 2:
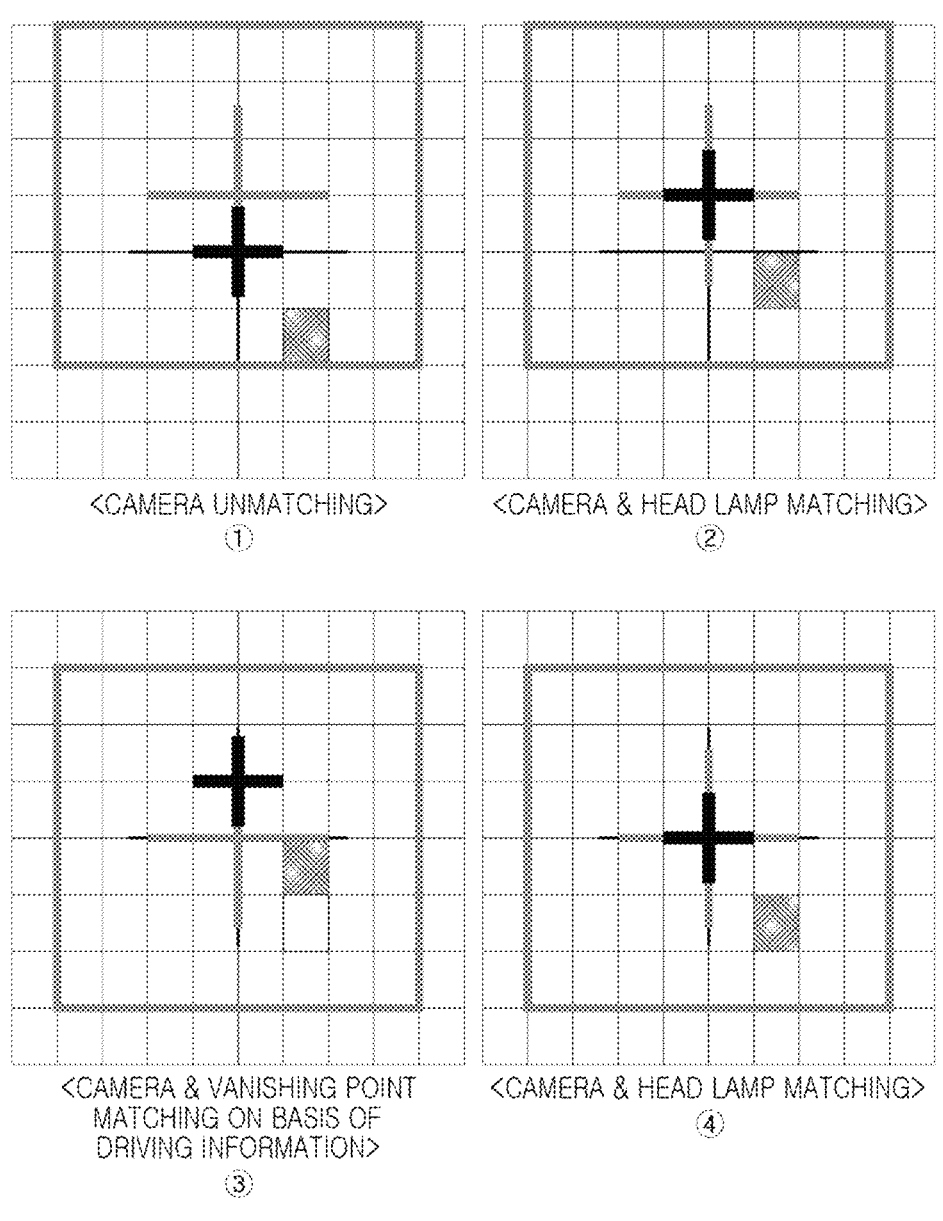
FIG. 2 is a diagram illustrating an example of lamp aiming adjustment performed in the vehicle using the lamp aiming adjustment instruments according to the related art.
Figure 3:
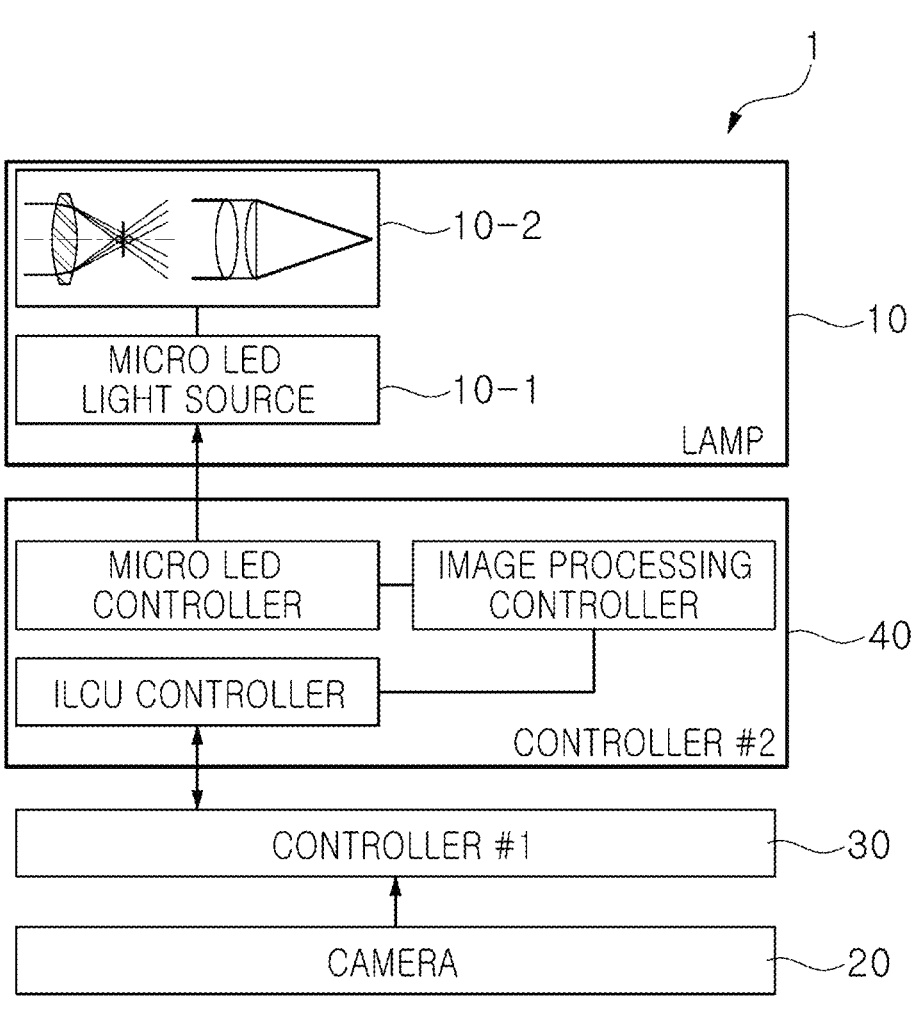
FIG. 3 is a block diagram illustrating an electronic lamp aiming system for a vehicle according to the present disclosure.

Referring to FIG. 3, an electronic aiming system 1 for a vehicle includes a lamp 10, an image receiver 20, a controller #1 30 (i.e., a second controller), and a controller #2 40 (i.e., a first controller). In this case, thin arrows indicate a direction of data transmission and reception between components. In this case, the lamp 10 is any type of lamp that uses a light source, but for the ease of description of aiming, the lamp 10 is exemplified as a head lamp 10.

As an example, the head lamp 10 is a head lamp that is an intelligent front lighting system (HD-IFS) distributing light to a pixel area using a multi-pixel IFS. The number of pixels may be about 1,000 cells or more and the IFS performs some of the main functions (i.e., LOW/HIGH BEAM) of the head lamp to distribute the light to a target 50 (see FIG. 4).

In particular, the head lamp 10 may use a light source 10-1 as a multi-element light-emitting diode (LED) light source and may include an optical system 10-2. The optical system 10-2 may be formed by a combination of lenses with convex and concave surfaces in order to improve a G value (i.e., glare reduction) and thereby improve a resolution of the head lamp 10. In this case, the optical system 10-2 is formed of two or more groups of different lenses (e.g., two convex lenses/one concave lens or refractive indexes of 1.2/1.4, etc.), and thus three or more lenses are used to reduce aberration.

As an example, the image receiver 20 provides image information, in which a target in front of the vehicle is recognized as an image, to the controller #1 30. In this case, one example of the image receiver 20 is a camera, but is not limited to the camera.

As an example, the controller #1 30 recognizes a light distribution area from the image information of the image receiver 20. The controller #2 40 controls aiming for the light source 10-1 by adjusting a lighting pixel area (e.g., 3C, 3B, and 3D of FIG. 7) among an unused light emit surface (LES) area 15 (see FIG. 7) of the light source 10-1 within the light distribution area provided by the controller #1 30.

Referring to FIG. 4, the image receiver 20 provides image information, in which the target 50 in front of the vehicle is recognized as an image, to the controller #1 30. In this case, dashed lines represent usage information and an operating state of a corresponding device.

The controller #1 30 then transmits pixel lighting information (e.g., lighting positions 1 and 2 in FIG. 6) to the controller #2 40, in which unmatching or mismatching between a camera center point and a head lamp center point (see FIG. 7) is confirmed based on the vanishing point in the image (see FIG. 7) from the image information obtained through the image receiver 20.

In addition, the controller #2 40 controls a low/high beam 11 of the head lamp 10 and performs matching of the head lamp center point on the camera center point to become an actual camera recognition position for actual camera unmatching of the lighting information (e.g., center point adjustment matching S6 of FIG. 6).

In addition, the controller #2 40 performs matching of the camera center point to the head lamp center point (e.g., position information adjustment matching S6 of FIG. 6) for the actual camera recognition position unmatching mismatching on the lighting information of the head lamp 10.

Figure 5:
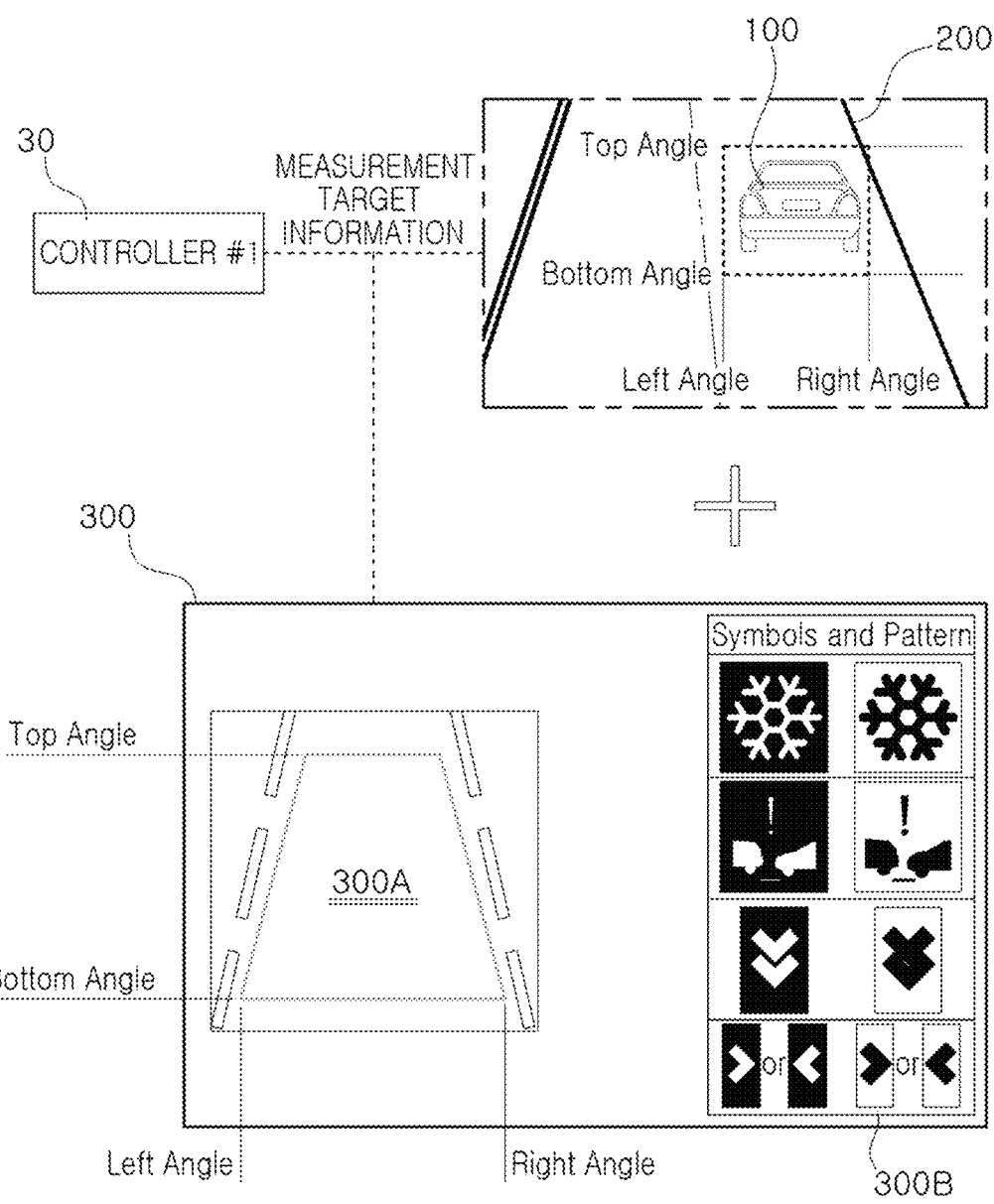
FIG. 5 is a diagram illustrating an example of expanding the target, which is a measurement target, to a recognizable symbol other than the vehicle in a controller #1 of the electronic aiming system according to the present disclosure.

Referring to FIG. 5, the controller #1 30 measures the image information of the image receiver 20 into four pieces of information including top angle information, bottom angle information, left angle information, and right angle information. In this case, dashed lines represent usage information of a corresponding device.

However, the image receiver 20 may expand the target 50 as a front vehicle 100 traveling on a forward or front road 200 or expand the target 50 as a measurable recognizable symbol 300, such as a lane 300A or a design 300B by replacing the front vehicle 100. In this case, the design 300B may be an image of a road surface or a sign placed on a road or a sticker attached to a rear side of the front vehicle 100.

Therefore, the controller #1 30 may utilize any one of the front vehicle 100, the lane 300A, or the design 300B as the image information.

Referring to FIG. 6, an electronic aiming method of the electronic aiming system 1 includes transmitting a lighting position 1 (S1), outputting the lighting position 1 (S2), transmitting position information of a lighting position 2 (S3), transmitting position information (S4), determining the lighting positions 1 and 2 (S5), and adjusting aiming (S6). In this case, when an LED in the unused LES area 15 of the light source 10-1 is set as a pixel, the lighting position 1 is a specific pixel, and the lighting position 2 is a pixel below or above the specific pixel.

Therefore, the electronic aiming method for the head lamp 10 may be a method in which the head lamp center point is matched to the camera center point through center point adjustment matching in operation S1 to S6. The electronic aiming method may also be a method in which the camera center point is matched to the head lamp center point through position information adjustment matching in operations S1 to S6.

In particular, the matching method is applied to both the lamp 10 and the image receiver 20 (i.e., the camera). Although the lighting positions 1 and 2 are exemplified as LEDs, the lighting positions 1 and 2 are not limited to the LEDs. Thus, the light source on the head lamp may also be applied.

Figure 7:
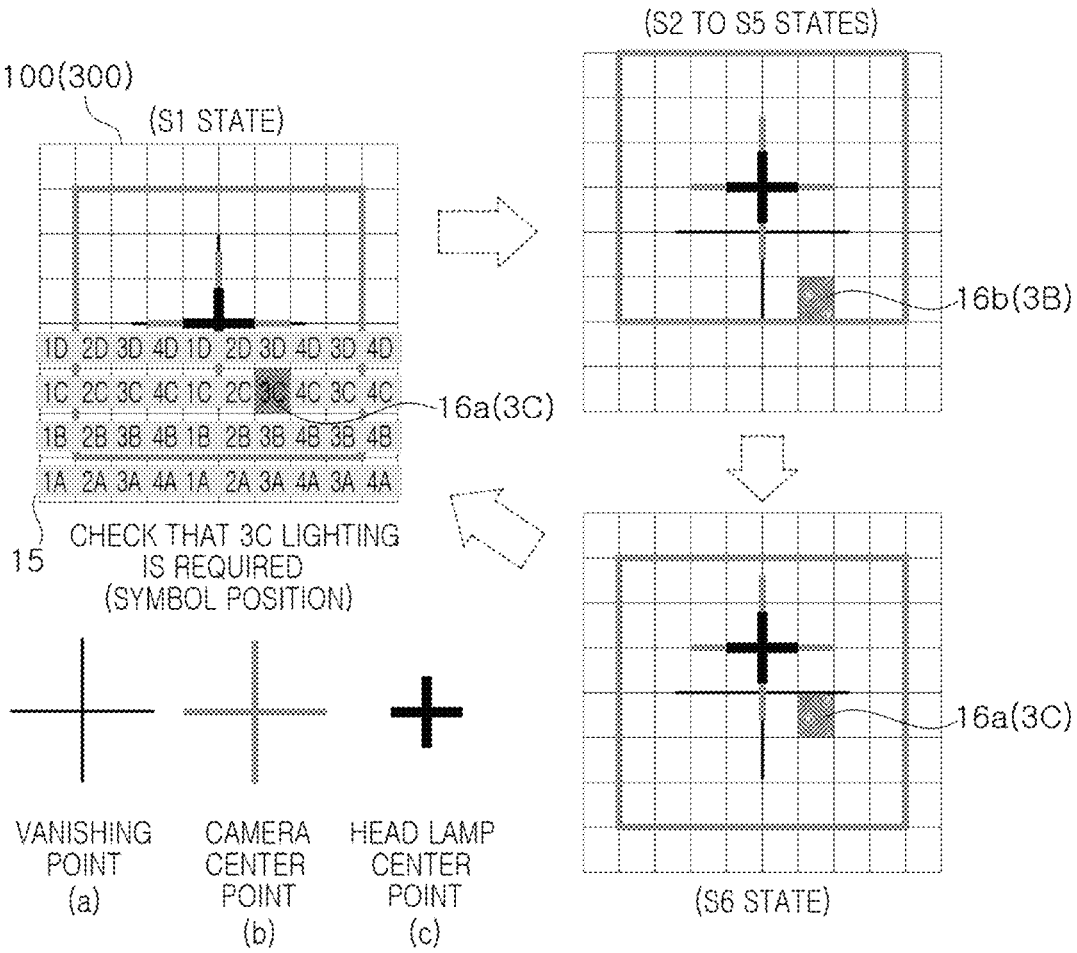
FIG. 7 is a diagram illustrating an example of center point adjustment and position information adjustment matching (i.e., position correction) for a lamp and a camera performed by the camera and controllers #1 and #2 according to the present disclosure.

Referring to FIG. 7, the center point adjustment matching or the position information adjustment matching applies a "vanishing point (a)" to a light distribution area of the target 50 and applies a matching state according to an overlapping of "+" shapes with different sizes indicating a "camera center point (b)" to the image receiver 20 and a "head lamp center point (c)" to the head lamp 10.

As an example, in a state in which a cross intersection position of the "vanishing point (a)" is aligned with a bottom side of the symbol information (i.e., a bottom angle display area), the cross intersection positions of the "camera center point (b)" and the "head lamp center point (c)" overlap with the "vanishing point (a)."

Then, the controller #1 30 or the controller #2 40 sets and memorizes or stores a specific LED element as a "home position for aiming" in a second quadrant (i.e., 90° to 180° sections) of the cross intersection section formed by the "vanishing point (a)," the "camera center point (b)," and the "head lamp center point (c)." To this end, table numbers (e.g., 1A, 1B, 1C, 1D, and . . . ) for a plurality of LED elements constituting light source 10-1 use the matched unused LES area 15.

As an example, an LED 3C element 16a, which is a "3C" located in the second quadrant of the unused LES area 15, may be set to the "home position for aiming." In this case, the lighting position 1 and the lighting position 2 are also implemented in the unused LES area 15.

Specifically, in a method of matching the head lamp center point to the camera center point through the center point adjustment matching, transmitting the lighting position 1 (S1) is performed by transmitting a lighting signal (SIGnal) to the LED 3C element 16a assigned to table number 3C stored and memorized by the controller #2 40. The lighting position 1 is recognized as the "home position" specified to the LED 3C element 16a. In this case, the LED 3C element 16a may be assigned to a different table number during the repeated aiming process.

In this way, in outputting the lighting position 1 (S2) of the controller #2 40, the LED 3C element 16a corresponding to lighting position 1 of the light source 10-1 of the head lamp 10 is turned on in response to a lighting signal for the lighting position 1.

Next, in transmitting the position information of the lighting position 2 (S3), the front vehicle 100 shown in the image information of the image receiver 20 or a lighting state of the light source 10-1 displayed on the recognizable symbol 300 is recognized as the lighting position 2. The lighting position 2 is transmitted to the controller #1 30 as the position information of the lighting position 2. Subsequently, in transmitting the position information (S4), the position information of the lighting position 2 is transmitted from the controller #1 30 to the controller #2 40.

As an example, the lighting position 2 is exemplified by an LED 3B element 16b located lower than the LED 3C element 16a of the lighting position 1. In this case, the lighting position 2 may be the same as the lighting position 1 but is exemplified as a different LED element for the aiming correction procedure.

Determining the lighting positions 1 and 2 (S5) is then performed by checking consistency of the lighting position 1 and the lighting position 2 (e.g., the lighting position 1=the lighting position 2) by the controller #2 40.

As an example, since checking the consistency of the lighting position 1 and the lighting position 2 uses the table numbers (e.g., 1A, 1B, 1C, 1D, and . . . ) of LED elements matched to the LED position table 15, the controller #2 40 terminates the aiming correction when the LED 3C elements 16a are equally turned on at the lighting position 1 and the lighting position 2. On the other hand, the controller #2 40 recognizes the lighting of the LED 3B element 16b as the lighting position 2, other than the lighting of the LED 3C element 16a as lighting position 1, thereby recognizing the inconsistency between the lighting positions 1 and 2.

When the lighting positions 1 and 2 are in an inconsistency state (No of S5), the controller #2 40 then controls to change the lighting LED elements of the light source 10-1 to move to lighting positions, thereby performing the adjusting of the aiming (S6) in which camera and head lamp center point matching is performed. This solves a 3C-3B lighting unmatching or mismatching problem, in which a lighting output position 3C of 3C lighting information (LED 3C element 16a) is displayed as 3B lighting information (LED 3B element 16b), by "upward matching of the head lamp center point (c)."

Thereafter, in determining the lighting positions 1 and 2 (S5), the consistency of the lighting position 1 and the lighting position 2 (e.g., the lighting position 1=the lighting position 2) is confirmed through the "upward matching of the head lamp center point (c)." As a result, the method of matching the head lamp center point to the camera center point through the center point adjustment matching is completed.

Specifically, in the method of matching the camera center point to the head lamp center point through the position information adjustment matching, the controller #2 40 transmits the lighting position 1 (e.g., 3C) as a lighting signal (SIG) of the LED in a state S1. An actual lighting position (e.g., 3D) generated from the micro LED 10-1 of the head lamp 10 is output differently from the lighting position 1 in a state S2.

The camera 20 is then matched to the lighting position 1 (e.g., 3C) in a state S3. When the position information of the lighting position 1, in which a lighting state of the micro LED 10-1 matches the lighting position 1 (e.g., 3C) at a top angle and a bottom angle of the symbol information in the front image, is confirmed, the position information of lighting position 1 is transmitted to the controller #1 30. The controller #1 30 transmits the position information of the lighting position 1 to the controller #2 40 in a state S4.

In a state S5, the controller #2 40 then confirms consistency of the lighting position 1 and the position information of the lighting position 1 to terminate the procedure. When the consistency is not confirmed, the controller #2 40 enters a state S6 and repeats control of changing the lighting LED element of the light source 10-1 to move the lighting position.

In this way, in determining the lighting positions 1 and 2 (S5), the consistency of the lighting position 1 and the lighting position 2 (e.g., the lighting position 1=the lighting position 2) is confirmed through the matching of the camera center point and the head lamp center point. As a result, the method of matching the camera center point to the head lamp center point through the position information adjustment matching is completed.

As described above, in the aiming method implemented in the electronic aiming system 1 of a vehicle according to the present embodiment, the controller #1 30 recognizes the light distribution area using the information of the target 50 in the top/bottom/left/right angles in the front image of the image receiver 20 for the target 50, which is light-distributed to the multi-element LED type light source 10-1 of the head lamp 10. The controller #2 40 adjusts the pixel area of the light source 10-1 based on the light distribution area to perform the aiming correction and apply the adjusted pixel area to the light distribution of the head lamp 10. Thus, through the electronic aiming structure not using head lamp aiming instruments, direct matching between the head lamp and the camera, which is required for high-precision aiming, is secured, and a vehicle attitude can also be determined without a plurality of sensors using the secured matching.

An electronic aiming system of a vehicle and an aiming method thereof according to the present disclosure enable a replacement of a vehicle attitude detection structure together with omitting aiming instruments, thereby implementing the following functions and effects for a lamp, particularly, a head lamp.

First, in terms of component reduction, it is possible to omit sensors that measure a vehicle attitude for aiming between a head lamp and a camera, omit a structure for aiming a single product head lamp, and omit glue for fixing after active alignment of the single product head lamp. Second, in terms of omitting the aiming process, a correction device and a process for aiming a single product head lamp can be omitted and an active alignment process for correcting a home position when the single product head lamp is manufactured can be reduced. Third, in terms of aiming quality, it is possible to prevent aiming misalignment due to tolerance between the head lamp and a vehicle attitude, misalignment due to single product aiming tolerance between the head lamp and the camera, and misalignment due to tolerance in the active alignment process when the single product head lamp is manufactured. Fourth, in terms of lamp quality, it is possible to prevent color bleeding caused by glue used when the single product head lamp is manufactured.

While embodiments of the present disclosure have been described with reference to the accompanying drawings, it should be apparent to those of ordinary skill in the art that various changes and modifications can be made without departing from the spirit and scope of the present disclosure without being limited to the embodiments disclosed herein. Accordingly, it should be noted that such alternations or modifications fall within the claims of the present disclosure, and the scope of the present disclosure should be construed on the basis of the appended claims.

What is claimed is:

1. An electronic lamp aiming system for a vehicle, the system comprising:

a lamp that includes a light source and that outputs a first lighting position;

a first controller that includes a processor and a memory and that is configured to memorize the first lighting position and to transmit a lighting signal of the first lighting position to the lamp;

an image receiver that receives image information from a target that is light-distributed by the lamp; and a second controller that includes a processor and a memory and that is configured to recognize a second lighting position from the image information and to transmit position information of the second lighting position to the first controller, wherein the first controller checks whether the first and second lighting positions match, wherein, when a lighting position of the lamp and an actual camera recognition position do not match, the first controller adjusts a lamp center point to a camera center point to match the lamp center point and the camera center point, thereby performing position correction, wherein the light source is a multi-element light-emitting diode (LED), and wherein the multi-element LED is included in an unused light emit surface (LES) area of the light source.

2. The system of claim 1, wherein, when the first and second lighting positions do not match, the lighting position is moved by changing the multi-element LED.

3. An electronic lamp aiming system for a vehicle, the system comprising:

a lamp that includes a light source and that outputs a first lighting position;

a first controller that includes a processor and a memory and that is configured to memorize the first lighting position and to transmit a lighting signal of the first lighting position to the lamp;

an image receiver that receives image information from a target that is light-distributed by the lamp; and a second controller that includes a processor and a memory and that is configured to recognize a second lighting position from the image information and to transmit position information of the second lighting position to the first controller, wherein the first controller checks whether the first and second lighting positions match, wherein, when a lighting position of the lamp and an actual camera recognition position do not match, the first controller adjusts a camera center point to a lamp center point to match the camera center point to the lamp center point, thereby performing position correction, wherein the light source is a multi-element light-emitting diode (LED), and wherein the multi-element LED is included in an unused light emit surface (LES) area of the light source.

4. The system of claim 3, wherein, when the first and second lighting positions do not match, the lighting position is moved by changing the multi-element LED.

5. An electronic lamp aiming method using an electronic aiming system having a lamp center point matched to a camera center point through center point adjustment matching, the method comprising:

transmitting, by a first controller, a memorized first lighting position as a lighting signal of a lamp;

outputting the first lighting position from the lamp;

recognizing, by an image receiver, a second lighting position of the lamp and transmitting position information of the second lighting position to a second controller;

transmitting, by the second controller, the position information of the second lighting position to the first controller;

confirming, by the first controller, whether the first lighting position and the second lighting position match;

based on the first lighting position and the second lighting position not matching, adjusting the lamp center point of the lamp and repeating the method, wherein the first and second lighting positions are recognized by a multi-element light-emitting diode (LED) included in an unused light emit surface (LES) area of a light source.

6. The method of claim 5, wherein adjusting the lamp center point includes upward movement of the lamp center point.

7. The method of claim 5, wherein the second controller confirms the first lighting position or the second lighting position by one of a top angle, a bottom angle, a left angle, or a right angle given to a target that is light-distributed by the lamp.

8. An electronic lamp aiming method using an electronic aiming system having a camera center point matched to a lamp center point through position information adjustment matching, the method comprising:

transmitting, by a first controller, a memorized first lighting position as a lighting signal of a lamp;

outputting an actual lighting position generated from a head lamp that is different from the first lighting position;

recognizing, by an image receiver, the actual lighting position as a second lighting position of the lamp and transmitting position information of the second lighting position to a second controller;

transmitting, by the second controller, the position information of the second lighting position to the first controller;

confirming, by the first controller, whether the first lighting position and the second lighting position match; and based on the first lighting position and the second lighting position not matching, adjusting the camera center point of the image receiver and the lamp center point of the lamp, wherein the first and second lighting positions are recognized by a multi-element light-emitting diode (LED) included in an unused light emit surface (LES) area of a light source.

9. The method of claim 8, wherein adjusting the camera center point and the lamp center point is performed by matching the camera center point to the lamp center point.

10. The method of claim 8, wherein the second controller confirms the first lighting position or the second lighting position by one of a top angle, a bottom angle, a left angle, or a right angle given to a target that is light-distributed by the lamp.

\* \* \* \* \*